United States Patent [19]

Lecznar et al.

[11] Patent Number: 5,357,408

[45] Date of Patent: Oct. 18, 1994

[54] INTERIOR LAMP FOR AN AUTOMOTIVE VEHICLE

[75] Inventors: Mark T. Lecznar, Grosse Pointe Woods; William P. Mykytiuk, Taylor, both of Mich.

[73] Assignee: United Technologies Automotive, Inc., Dearborn, Mich.

[21] Appl. No.: 134,095

[22] Filed: Oct. 8, 1993

[51] Int. Cl.⁵ ............................................. B60Q 3/00
[52] U.S. Cl. ............................... 362/74; 362/80; 296/214
[58] Field of Search ............... 362/74, 80, 833, 364, 362/365; 296/214

[56] References Cited

U.S. PATENT DOCUMENTS

| | | | |
|---|---|---|---|
| 4,844,533 | 7/1989 | Dowd et al. | 296/214 |
| 4,893,867 | 1/1990 | Hilborn et al. | 296/214 |
| 4,902,068 | 2/1990 | Dowd et al. | 296/214 |
| 4,930,056 | 5/1990 | Stephenson et al. | 362/364 |
| 5,011,218 | 4/1991 | Danner et al. | 296/214 |
| 5,091,831 | 2/1992 | Van Order et al. | 362/74 |
| 5,136,485 | 8/1992 | Muller | 362/74 |
| 5,239,449 | 8/1993 | Wnuk et al. | 362/74 |

FOREIGN PATENT DOCUMENTS

| | | | |
|---|---|---|---|
| 2630060 | 10/1989 | France | 362/74 |
| 0003719 | 1/1979 | Japan | 296/214 |

OTHER PUBLICATIONS

Christiana Industries Corporation Brochure, entitled "CIC 9000—Basic Series" (no date).

Primary Examiner—Ira S. Lazarus
Assistant Examiner—Sara Sachie Raab
Attorney, Agent, or Firm—Harness, Dickey & Pierce

[57] ABSTRACT

A lamp assembly of the present invention is used in the interior of an automotive vehicle and comprises a lens, an illumination source, and a shield. The shield has at least a pair of arms oppositely extending therefrom and each has at least a pair of fingers which engage the top and bottom sides of a headliner panel. The illumination source is affixed upon a mounting portion of the shield and the lens is at least partially attached to the shield. The lamp assembly may be a dome lamp or may alternately be a reading/courtesy lamp.

18 Claims, 2 Drawing Sheets

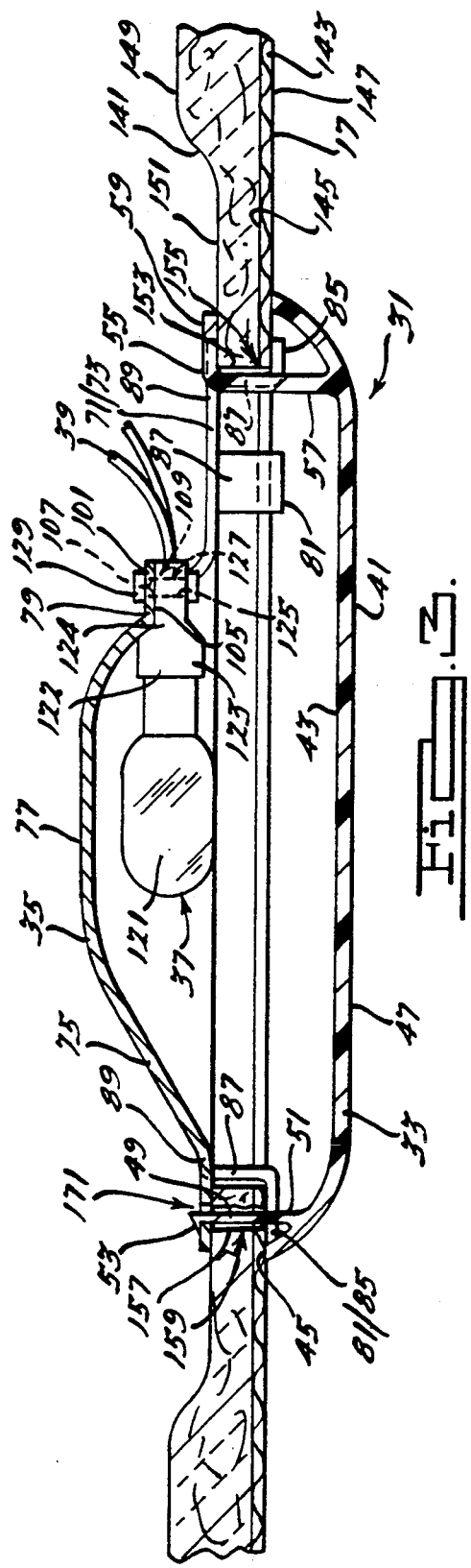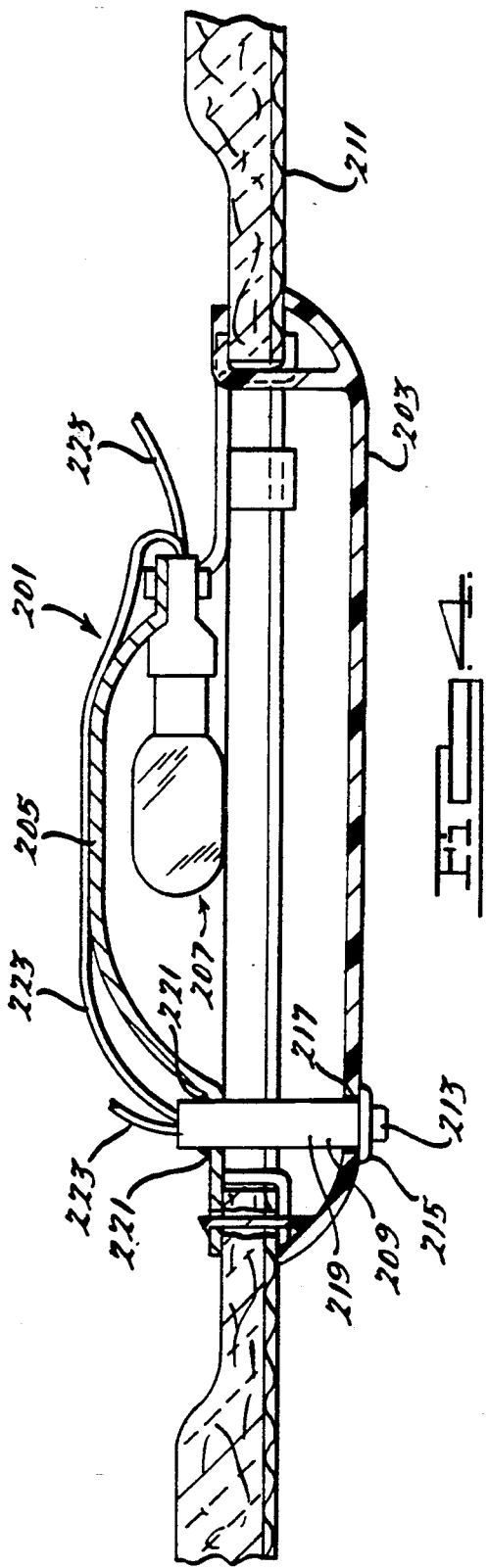

INTERIOR LAMP FOR AN AUTOMOTIVE VEHICLE

BACKGROUND OF THE INVENTION

This invention relates generally to an interior component used in an automotive vehicle and specifically to an interior lamp assembly suitable for attachment to a modular headliner assembly.

Traditionally, an interior dome lamp or a reading/courtesy lamp has a lens which is surrounded by an appearance bezel, a housing which protects a bulb, a bulb terminal or socket, an electrical connector and a vehicle fastening device. These conventional lamp assemblies are usually attached to a roof bow which extends transversely below the roof of the automotive vehicle. During manufacture of the vehicle, the lamp assembly, without the lens, is positioned overhead in the vehicle which is moving along an assembly line and an installer drives a screw through the housing and into the adjacent roof bow. The installer then connects a vehicle wire harness to the lamp electrical connector and snaps on the lens.

Alternatively, a lens can be snapped directly to the headliner panel rather than to a lamp housing if the headliner substrate has significant rigidity or has a local metallic reinforcement. While this lens attachment method may be suitable for the initial installation, the headliner substrate usually tends to deteriorate upon repeated lens removal for bulb servicing and replacement.

The automotive market has become increasingly competitive such that components used within automotive vehicles are required to be of lower cost and higher quality. Lower cost, higher quality components can be obtained by utilizing modular interior trim systems. Modular systems reduce assembly labor and integrate parts by having one part serve multiple functions. A modular system is disclosed in U.S. Pat. No. 4,902,068 entitled "Modular Headliner Assembly," issued to Dowd et al. on Feb. 20, 1990. In the Dowd et al. patent a headliner substrate is sandwiched between a retainer and an appearance lamp bezel. Another lamp assembly is shown in U.S. Pat. No. 4,893,867 entitled "Console Mounted to a Headliner," issued to Hilborn et al. on Jan. 16, 1990. In the Hilborn et al. patent a supplemental fastener is used to attach a lamp assembly to a vehicle roof bow or to a front header panel due to the compliant nature of the fiberglass substrate on which it is mounted. Both of these patents have a common assignee with the present invention and the disclosures of both patents are specifically incorporated by reference herein.

While the lamp assemblies for use with modular headliners illustrate improvements in the art over the traditional assembly line screw-in lamps, these modular lamp assemblies still require redundant retainers and additional fasteners for attachment to the vehicle roof bows.

SUMMARY OF THE INVENTION

In accordance with the present invention, a preferred embodiment of a new and useful lamp assembly for the interior of an automotive vehicle comprises a lens, an illumination source, and a shield. The shield has at least a pair of arms oppositely extending therefrom and each arm has at least a pair of fingers which engage the top and bottom sides of a headliner panel. The illumination source is affixed upon a mounting portion of the shield and the lens is at least partially attached to the shield. The lamp assembly may be a dome lamp or a reading/courtesy lamp.

The lamp assembly of the present invention is ideally suited for use with a modular headliner assembly since it can be preassembled to a headliner panel without the need for supplemental fasteners to retain the lamp to a vehicle roof bow or header panel. Furthermore, the specific design of the shield and lens allow for a resin impregnated fibrous substrate, often being somewhat flexible, to adequately provide support for the lamp assembly throughout the often harsh use of such in the automobile. This lamp assembly can accordingly be assembled to the headliner panel on an off-line stationary work surface at the assembler's waist height. This lamp is also constructed such that the illumination source can be directly connected to a modular headliner electricity carrying conductive member without intermediate electrical connectors or pigtails. Moreover, the shield serves multiple functions since, first, it provides an optically reflective background for the illumination source, second, it acts as a heat sink for the illumination source whereby heat is dissipated away from the lamp assembly, third, the shield serves to retain the lamp assembly to the headliner panel and, fourth, it protects the illumination source from damage.

Additional advantages and features of the present invention will become apparent from the following description and appended claims, taken in conjunction with the accompanying drawings.

BRIEF DESCRIPTION OF THE DRAWINGS

FIG. 3 is a vertical sectional view of the present invention lamp assembly in relation to the modular headliner assembly, taken along line 3—3 from FIG. 2; and FIG. 4 is a vertical sectional view, similar to that of FIG. 3, of a second preferred embodiment of the lamp assembly of the present invention in relation to the modular headliner assembly.

DETAILED DESCRIPTION OF THE PREFERRED EMBODIMENTS

Figure 1:
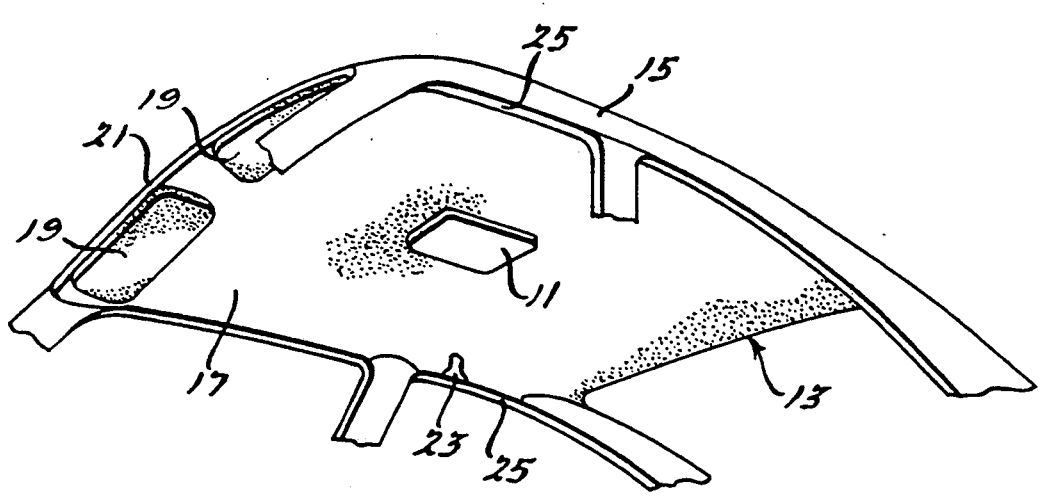
FIG. 1 is a perspective view showing a first preferred embodiment of a lamp assembly of the present invention in relation to a modular headliner assembly installed within an automotive vehicle.

Referring to FIG. 1, a lamp assembly 11 of the present invention is shown assembled to a modular headliner 13 which, in turn, is installed adjacent to the bottom side of an automotive vehicle roof 15. Modular headliner 13 is defined by a headliner panel 17 which has provisions for retaining a preassembled pair of sun visors 19 along a front edge 21, a pair of coat hooks 23 proximate with side edges 25, and the present invention lamp assembly 11 in the center thereof. Of course, as is known to one skilled in the art, overhead consoles (not shown), assist handles (not shown), center high mounted stop lamps (not shown) and wire harnesses (not shown) may also be incorporated within modular headliner 13.

Figure 2:
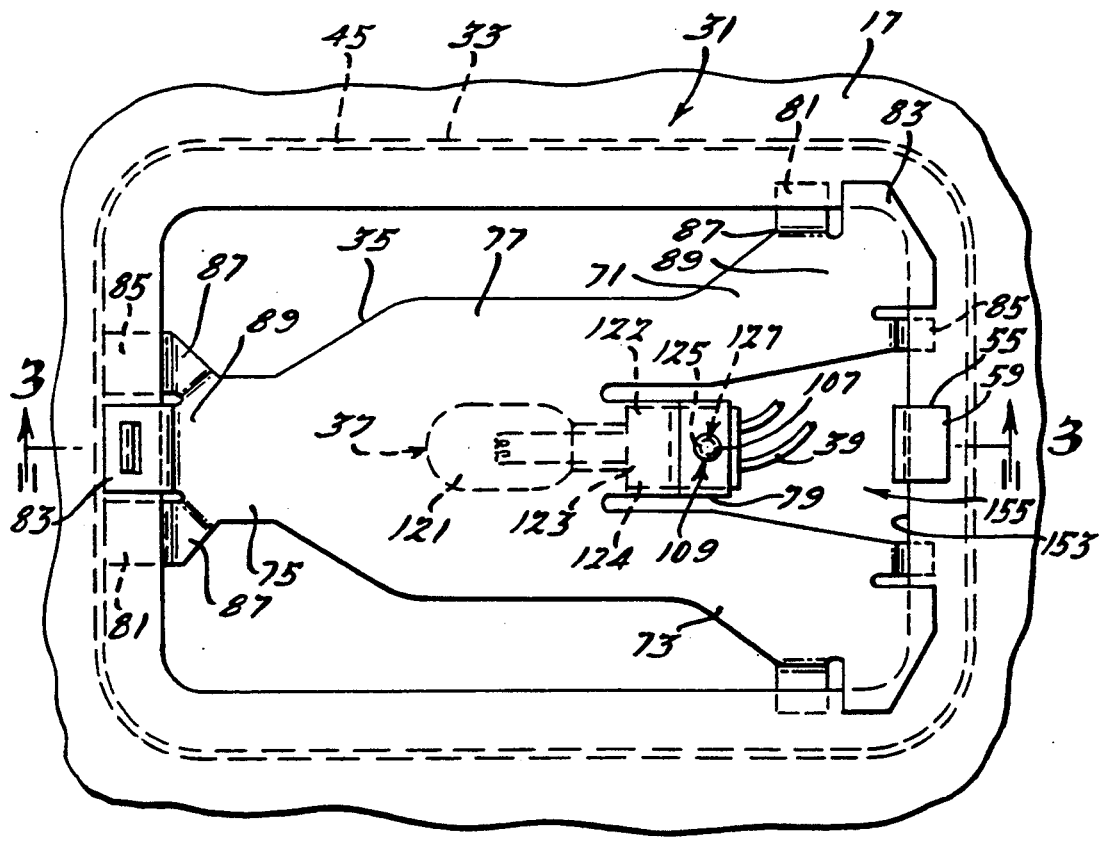
FIG. 2 is a fragmentary top elevation view of the present invention lamp assembly of FIG. 1 installed within the modular headliner assembly.

A first preferred embodiment of lamp assembly 11 of the present invention is a dome lamp 31. This is illustrated in FIGS. 2 and 3. Dome lamp 31 is comprised of a lens 33, a shield 35, an illumination source 37 and electricity carrying conductive members 39.

Lens 33 has an appearance surface 41 and an upper surface 43 bordered by a peripheral edge 45 extending therearound. Furthermore, lens 33 has a central portion 47 which is optically transparent but may have a variety of light scattering finishes or Fresnal patterns thereon for directing light. Upper surface 43 of lens 33 also has a first fastening member 49 extending upward therefrom. Fastening member 49 has a snap fit construction comprised of a resilient elongated portion 51 and a barb shaped end 53. Upper surface 43 of lens 33 further has a second fastening member 55 upwardly extending therefrom located peripherally opposite from fastening member 49. Fastening member 55 preferably has an inverted L-shaped construction with an elongated leg 57 upwardly projecting from upper surface 43 and a relatively shorter leg 59 outwardly projecting thereabove. Alternately, fastening member 55 may have a similar snap fit construction as that of fastening member 49. Moreover, lens 33 is injection molded from a polymeric resin such as acrylic or polycarbonate.

Shield 35 is defined by three attachment arms 71, 73 and 75 which are triangularly spaced apart from one another and join together at a central segment 77. Shield 35 further has a mounting portion 79 projecting from central portion 77. Attachment arms 71, 73 and 75 each have three fingers 81, 83 and 85 extending outward therefrom. Outboard fingers 81 and 85 have an offset portion 87 which protrudes downward from an intermediate section 89. Therefore, fingers 81, 83 and 85 are adjacent to one another in a first plane, as is shown in FIG. 2, but when viewed in a second plane, as is shown in FIG. 3, fingers 81 and 85 are offset from central finger 83. Moreover, for attachment arms 71 and 73, fingers 81 and 85 are juxtapositioned at a substantially right angle from one another and are separated by a broadened central finger 83.

Central segment 77 of shield 35 has a somewhat parabolic cup shape which rises above arms 71, 73 and 75. Mounting portion 79 projects from central portion 77 and is located between arms 71 and 73. Furthermore, mounting portion 79 has a substantially flat plateau 101 which is defined by a top surface 103 and a bottom surface 105. Moreover, mounting portion 79 also has an inside surface 107 which is cylindrically shaped such that a bore 109 is defined therein. Shield 35 is made from a somewhat flexible and shiny metallic material such as stamped spring steel. Accordingly, central segment 77 operably acts as a light reflector and heat sink.

Illumination source 37 is comprised of a light bulb 121 and a bulb socket 122. Light bulb 121 is preferably a T-5 wedge base bulb that fits within a series CIC-9000 socket which can be obtained from Christiana Industries Corporation, Chicago, Ill. Socket 122 is further defined by an electrical terminal section 123, which retains and electrically powers light bulb 121, and a mounting section 124. Mounting section 124 of socket 122 further has a transversely oriented cylindrically-shaped inside surface 125 which defines a tunnel 127 therein. Socket 122 is positioned against bottom side 105 of shield plateau 101 such that tunnel 127 of socket 122 is concentrically aligned with bore 109. A rivet 129 is inserted within tunnel 127 and bore 109 wherein bulb socket 122 is retained to shield 35 such that bulb 121 is juxtapositioned below central segment 77. Electricity carrying conductive members 39 are electrically connected to bulb socket 122 such that light bulb 121 can be illuminated when a vehicle door (not shown) is opened or an instrument panel rheostat (not shown) is actuated. Electricity carrying conductive members 39 are preferably insulated wires that comprise a portion of the headliner wiring harness.

Headliner panel 17 is comprised of a resin impregnated fiberglass headliner substrate 141 and a decorative covering material 143 adhesively affixed on the bottom side 145 thereof. Also, headliner panel 17 has an appearance side 147 and a back side 149 which is mounted adjacent to roof 15 (see FIG. 1). Headliner substrate 141 is compression moldable such that a densely compacted area 151 can be formed in preselected areas. Nonetheless, headliner panel 17 is still fairly flexible. Moreover, headliner panel 17 further has a cut inside edge 153 which defines an aperture 155 therein. Additionally, a cut inside surface 157 defines a relatively narrow passageway 159 therein. Lamp assembly 11 partially fits within aperture 155 and passageway 159.

Shield 35 is assembled to headliner panel 17 by squeezing attachment arms 71, 73 and 75 toward each other such that fingers 81 and 85 of each attachment arm 71, 73 and 75 can be inserted through aperture 155. Attachment arms 71, 73 and 75 are then allowed to return back to their free state positions whereby central finger 83 engages back side 149 of headliner panel 17 and outboard fingers 81 and 85 engage appearance side 147 of headliner panel 17. Lens 33 is then affixed to lamp assembly 11 against appearance side 147 of headliner panel 17. Short leg 59 of second fastening member 55 is engagably inserted upon back side 149 of headliner panel 17. Lens 33 is then pivoted about short leg 59 such that first fastening member 49 is inserted through passageway 159. Lens 33 is further compressed against attachment arm 75 such that barb 53 is snapped through a slot 171 contained within central finger 83. Illumination source 37 is thereby located between lens 33 and shield 35.

A second preferred embodiment of lamp assembly 11 of the present invention is a reading/courtesy lamp 201. This is shown in FIG. 4. Reading/courtesy lamp 201 is substantially similar to that of dome lamp 31, however, reading courtesy lamp 201 can be directly turned on and off by the occupant of the automotive vehicle in addition to opening the vehicle doors (not shown) or actuating the instrument panel rheostat (not shown). Reading/courtesy lamp 201 is comprised of a lens 203, a shield 205, an illumination source 207, and an electrical switch 209. Reading/courtesy lamp 201 is affixed to a headliner panel 211 in substantially the same manner as is dome lamp 31 (see FIGS. 2 and 3).

Switch 209 has a rocker type or push-push type of construction as is known to one skilled in the art. Switch 209 further has a button 213 which is occupant accessible and is surrounded by an aesthetically pleasing bezel 215. Bezel 215 fits against a portion of lens 203 and serves to cover an orifice 217 through which a switch body 219 upwardly extends. A pair of snap fit projections 221 oppositely project from lateral sides of an upper portion of switch body 219. These snap fits 221 operably engage a portion of shield 205. Electricity carrying conductive members 223 electrically connect switch 209 to illumination source 207 as well as to a headliner wire harness.

While the preferred embodiments of this lamp assembly have been disclosed, it will be appreciated that various modifications may be made without departing from the present invention. For example, the shield may have only a pair of oppositely extending attachment arms or may alternately have four or more attachment arms. Furthermore, while a specific dome lamp and a specific reading/courtesy lamp have been described, any overhead console having an illumination source incorporated therein may be similarly constructed without departing from the scope of this invention. Moreover, while a specific illumination source and electricity carrying conductive member have been disclosed, electroluminescent or fiber-optic lamps can also be used in conjunction with electricity carrying metal stampings or highly conductive printed ink circuits. Various materials have been disclosed in an exemplary fashion, however, a variety of other materials may of course be employed. It is intended by the following claims to cover these and any other departures from the disclosed embodiments which fall within the true spirit of this invention.

What is claimed is:

1. A lamp assembly for use in the interior of an automotive vehicle comprising:
   a lens having a central portion thereof which is substantially optically transparent therethrough, said lens further having an appearance surface and an upper surface both of which are bordered by a peripheral edge therearound, said upper surface of said lens having a first fastening member and a second fastening member extending upward therefrom, said second fastening member being spatially interposed away from said first fastening member;
   an illumination source;
   an electricity carrying conductive member having said illumination source electrically connected thereto; and
   a shield being defined by at least two attachment arms with a central segment therebetween, each of said attachment arms of said shield having at least two projecting fingers extending therefrom such that said fingers are offset from one another, said first fastening member of said lens being fastened to said shield such that said lens is retained therebelow, said central segment of said shield further having a mounting portion proximate therewith such that said illumination source is affixed thereto, said illumination source being substantially juxtapositioned between said central segment of said shield and said upper surface of said lens.

2. The lamp assembly of claim 1 wherein a headliner panel is defined by a headliner substrate and a decorative covering material which is located on a lower side thereof, said headliner panel further has a lower appearance side and an upper back side thereof mounted substantially adjacent to the bottom of a roof of said automotive vehicle, said headliner substrate and said decorative covering material also have an inside edge therein which defines an aperture therethrough, said fingers of said shield attachment arms are engagable with said appearance and back sides of said headliner panel, at least one of said fingers of each of said attachment arms are juxtapositioned to engage said back side of said headliner substrate and another of said fingers of each of said attachment arms are oppositely juxtapositioned and offset therefrom so as to engage said appearance side of said headliner panel, whereby said shield is retained to said headliner panel.

3. The lamp assembly of claim 2 wherein said central segment of said shield has three of said attachment arms triangularly interposed therefrom.

4. The lamp assembly of claim 3 wherein each of said attachment arms of said shield has at least three fingers extending therefrom, the outermost of said fingers is substantially co-planar with each other along said second plane created substantially horizontal therethrough.

5. The lamp assembly of claim 4 wherein:
   said first fastening member of said lens has a snap fit construction with a resilient elongated portion upwardly extending therefrom with a barb shaped end thereon, said barb shaped end of said first fastening member is engaged with one of said fingers of said shield; and
   said second fastening member of said lens has an inverted L shape thereto with an elongated leg upwardly projecting therefrom and a relatively shorter leg outwardly projecting thereabove, said shorter outwardly projecting leg of said second fastening member is engagable with said upper surface of said headliner panel;
   whereby said lens is affixed to said headliner panel.

6. The lamp assembly of claim 2 wherein said substrate of said headliner panel is a compression moldable resin impregnated fibrous material.

7. The lamp assembly of claim 1 wherein said central segment of said shield acts as a light reflector.

8. The lamp assembly of claim 7 wherein said shield is made from a reflective metallic material.

9. The lamp assembly of claim 8 wherein said central segment of said shield is substantially parabolically shaped.

10. The lamp assembly of claim 1 wherein said illumination source further comprises:
    a light bulb; and
    a bulb socket having an electrical terminal section which retains said bulb and a mounting section which is affixed to said mounting portion of said shield.

11. The lamp assembly of claim 10 further comprising:
    said mounting section of said bulb socket having an inside surface transversely oriented therein which defines a tunnel therethrough;
    said mounting portion of said shield having an inside surface therein defining a bore therethrough, said bore of said shield being aligned with said tunnel of said bulb socket; and
    a fastener being inserted through said tunnel of said bulb socket and through said bore of said shield, whereby said illumination source is mounted to said mounting portion of said shield.

12. The lamp assembly of claim 1 further comprising:
    an electrical switch being mounted upon said lamp assembly and being electrically connected to said illumination source, said switch being operably accessible by an occupant of said automotive vehicle, whereby said illumination source can be directly electrically switched on and off.

13. The lamp assembly of claim 1 being preassembled to a modular headliner assembly.

14. A lamp assembly being affixed to a headliner panel in an automotive vehicle, said headliner panel being defined by a headliner substrate and a decorative covering material which is located on a lower side thereof, said headliner panel further having a lower appearance side and an upper back side thereof which is mounted substantially adjacent to the bottom of a roof of said automotive vehicle, said headliner substrate and said decorative covering material also having an inside edge therein defining an aperture therethrough, said lamp assembly further comprising:

a lens having a central portion thereof which is substantially optically transparent therethrough, said lens further having an appearance surface and an upper surface both of which are bordered by a peripheral edge therearound, said upper surface of said lens having a first fastening member and a second fastening member extending upward therefrom, said second fastening member being spatially interposed away from said first fastening member;

an illumination source;

an electricity carrying conductive member having said illumination source electrically connected thereto; and a shield being defined by at least three triangularly interposed attachment arms with a central segment therebetween, each of said attachment arms of said shield having at least three projecting fingers extending therefrom, said fingers of said shield attachment arms being engagable with said appearance and back sides of said headliner panel, at least one of said fingers of each of said attachment arms being juxtapositioned to engage said back side of said headliner substrate and at least one other of said fingers of each of said attachment arms being oppositely juxtapositioned so as to engage said appearance side of said headliner panel whereby said shield is retained to said headliner panel, said first fastening member of said lens being fastened to said shield such that said lens is retained therebelow, said central segment of said shield further having a mounting portion proximate therewith such that said illumination source is affixed thereto and is substantially juxtapositioned between said central segment of said shield and said upper surface of said lens.

15. The lamp assembly of claim 14 wherein:

said first fastening member of said lens has a snap fit construction with a resilient elongated portion upwardly extending therefrom with a barb shaped end thereon, said barb shaped end of said first fastening member is engaged with one of said fingers of said shield; and said second fastening member of said lens has an inverted L shape thereto with an elongated leg upwardly projecting therefrom and a relatively shorter leg outwardly projecting thereabove, said shorter outwardly projecting leg of said second fastening member is engagable with said upper surface of said headliner panel;

whereby said lens is affixed to said headliner panel.

16. The lamp assembly of claim 14 wherein said illumination source further comprises:

a light bulb; and a bulb socket having an electrical terminal section which retains said bulb and a mounting section which is affixed to said mounting portion of said shield.

17. The lamp assembly of claim 16 further comprising:

said mounting section of said bulb socket having an inside surface transversely oriented therein which defines a tunnel therethrough;

said mounting portion of said shield having an inside surface therein defining a bore therethrough, said bore of said shield being aligned with said tunnel of said bulb socket; and a fastener being inserted through said tunnel of said bulb socket and through said bore of said shield, whereby said illumination source is mounted to said mounting portion of said shield.

18. The lamp assembly of claim 14 further comprising:

an electrical switch being mounted upon said lamp assembly and being electrically connected to said illumination source, said switch being operably accessible by an occupant of said automotive vehicle, whereby said illumination source can be directly electrically switched on and off.

* * * * *